United States Patent
Lambert et al.

(10) Patent No.: US 7,190,634 B2
(45) Date of Patent: Mar. 13, 2007

(54) GPS-BASED UNDERWATER CABLE POSITIONING SYSTEM

(75) Inventors: Dale J. Lambert, Mandeville, LA (US); Robert E. Rouquette, Kenner, LA (US); Daniel B. Seale, Harahan, LA (US); Clem B. Guillot, Thibodaux, LA (US)

(73) Assignee: Input/Output, Inc., Stafford, TX (US)

( * ) Notice: Subject to any disclaimer, the term of this patent is extended or adjusted under 35 U.S.C. 154(b) by 350 days.

(21) Appl. No.: 10/509,703

(22) PCT Filed: May 22, 2003

(86) PCT No.: PCT/US03/16260

§ 371 (c)(1),
(2), (4) Date: Sep. 30, 2004

(87) PCT Pub. No.: WO03/100451

PCT Pub. Date: Dec. 4, 2003

(65) Prior Publication Data

US 2005/0180263 A1    Aug. 18, 2005

(51) Int. Cl.
*G01V 1/40* (2006.01)
(52) U.S. Cl. ........................................... 367/128
(58) Field of Classification Search ............. 367/128, 367/106, 130, 16, 19, 20
See application file for complete search history.

(56) References Cited

U.S. PATENT DOCUMENTS 6,941,226 B2    9/2005    Estep

2004/0004907 A1 *    1/2004    Austad et al. ............. 367/154

* cited by examiner

*Primary Examiner*—Dan Pihulic
(74) *Attorney, Agent, or Firm*—James T. Cronvich

(57) ABSTRACT

A GPS-based underwater cable positioning system for use in determining the shape and position of hydrophone streamers towed underwater behind survey vessels involved in marine seismic prospecting. The system includes a plurality of surface units towed behind the vessel. Each surface unit includes a GPS receiver to receive radio frequency GPS signals and to determine its positions. Each surface unit also has an acoustic transmitter to transmit an acoustic message signal representing its position and an optional time stamp into the water. Acoustic receiver units, attached spaced apart locations along one or more streamer cables, each include an acoustic receiver to receive the acoustic message signals from the surface units and to determine its position from the message signals. To augment the message signals from the surface units at locations distant from the surface units, acoustic transceiver units may be used. The acoustic transceiver units are attached to the streamer cables at ranges between the surface units and distant acoustic receiver units. The acoustic transceiver units each include an acoustic receiver that performs as the receivers in the acoustic receiver units and an acoustic transmitter to transmit acoustic message signals representing its position and an optional time stamp into the water to be received by the acoustic receiver units. In this way, the positions and shapes of towed streamer cables can be determined.

26 Claims, 7 Drawing Sheets

| 15-bit X | 15-bit Y | Time Stamp |
|---|---|---|
FIG. 4
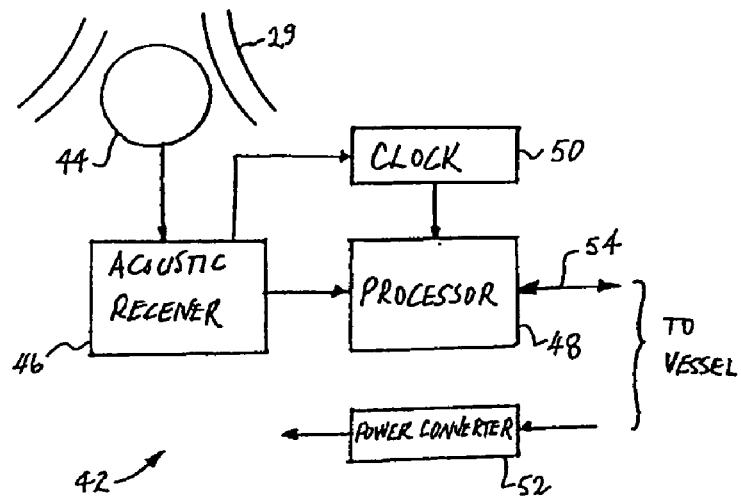
FIG. 5
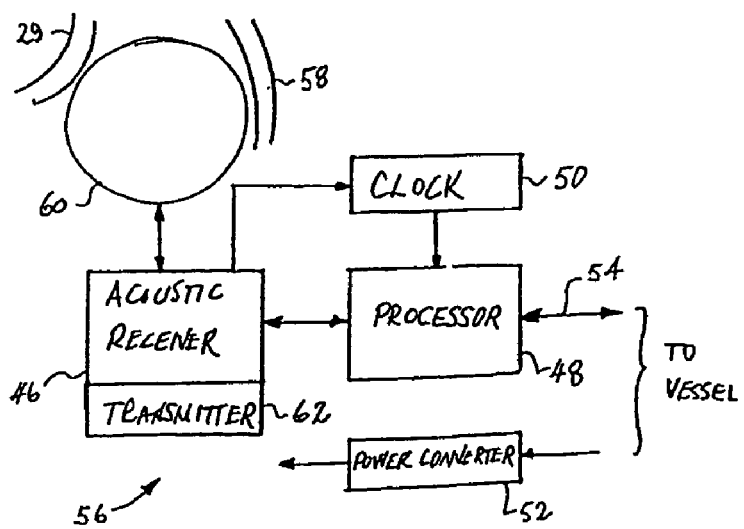
FIG. 9

GPS-BASED UNDERWATER CABLE POSITIONING SYSTEM

BACKGROUND

The invention relates generally to offshore seismic prospecting and, more particularly, to apparatus and methods for determining the position and shape of hydrophone streamer or bottom cables towed or dragged underwater behind seismic survey vessels.

In offshore seismic prospecting, a group of underwater cables, commonly referred to as streamers, is towed through the water by a marine vessel, such as a surface ship. Each streamer is instrumented with an array of hydrophones used to receive seismic reflections off undersea geologic formations and with a variety of sensors and control devices used to determine the shape and position of the streamers and to control their depth. The surface ship also tows a seismic source, typically an array of air guns fired at regular intervals to radiate seismic energy into the geologic formations. For an accurate survey, the shape and position of the streamers and the seismic source must be known accurately. Conventionally, depth sensors, acoustic ranging transceivers, and magnetic compasses are deployed along the streamers to provide data from which the relative shapes of the streamers can be computed on board the vessel or when the seismic data are processed. Head and tail buoys are tethered to the head and tail ends of the streamers as visual markers. Acoustic ranging transceivers at the surface ship and on the seismic source combine with the transceivers at the head end of the streamers to form an acoustic network to tie the positions of the head ends of the streamers to the ship and the seismic source. Acoustic ranging transceivers on the tail buoys and at the tail end of the streamers form a tail-end acoustic network. GPS (Global Positioning System) receivers on the ship, on the seismic source, and on the tail buoys at the tail ends of the streamers help tie the positions of the head and tail ends of the streamers, the seismic source, and the ship to absolute geodetic positions. A complex navigation system is used to estimate the sensor positions and thereby the shapes of the streamers from the many depth, range, and heading observations made in the entire streamer spread.

While these conventional cable positioning systems work well, they do have some shortcomings. For example, the acoustic ranging transceivers take a lot of power to transmit acoustic pulses of sufficient energy to achieve quality long ranges. This power requirement shortens battery life for battery-powered devices and puts constraints on those devices powered inductively from the streamers. Furthermore, in-line ranges (i.e., ranges along the length of the streamer) are difficult to achieve especially if the acoustic transducers are mounted within, rather than suspended from, the streamers. And in-streamer compasses are negatively affected by their proximity to metal strength members and conductors running through the streamers. But when these devices are suspended from, rather than built into, a streamer, they must be removed before the streamer is wound up on the storage reel and attached again as the streamer is payed out. This removal and attachment interrupts streamer retrieval and deployment. The navigation system, moreover, only estimates the positions of the sensors from a model of the streamer and from the many observations. Because many of the position estimates are reckoned from one or more other estimated positions, position errors can build up along the streamers. This problem of position error propagation is especially troublesome in longer streamers.

As these shortcomings suggest, there is a need for a streamer positioning system that can provide benefits such as low power consumption, minimal interruption to streamer retrieval and deployment, and accurate streamer positioning.

The use of GPS for navigation is widespread and continues to develop. Because the GPS satellites transmit radio frequencies, which cannot penetrate water, they are not directly useful in underwater applications. But there have been efforts to extend GPS to underwater use. For example, U.S. Pat. No. 5,119,341, "METHOD FOR EXTENDING GPS TO UNDERWATER APPLICATIONS," issued Jun. 2, 1992, to Youngberg describes a system that provides buoy-mounted beacons that dynamically determine their positions from GPS satellite signals and broadcast data representing their positions acoustically to underwater vehicles. In another system, the NASNet™ system sold by Nautronix Ltd. of Fremantle, Australia, a network of stations is placed on the sea floor at surveyed locations. Once in place, the stations acoustically transmit time-related GPS-like information to one or more receive-only users, which can use the information in much the same way as a GPS receiver does with GPS data.

But, in both these "underwater GPS" systems, the acoustic transmitters are immobile or drifting and cover a fixed or slowly changing volume of the ocean. To be used in another part of the ocean, such as for a new seismic survey, another such network would have to be set in place. For this reason, both of the systems described have shortcomings for use in streamer positioning in offshore seismic prospecting.

SUMMARY

The previously mentioned shortcomings are overcome and the needs satisfied by a streamer cable positioning system having features of the invention. The positioning system includes at least two surface units traveling with a marine vessel at the water surface. Each surface unit has a GPS receiver that receives radio-frequency GPS signals and determines its position. An acoustic transmitter in each surface unit transmits an acoustic message signal representing the surface unit's position. A plurality of acoustic receiver units are disposed underwater along one or more cables towed behind the vessel. Each cable extends from a head end nearer the vessel to an opposite tail end. Each acoustic receiver unit includes an acoustic receiver that receives the acoustic message signals transmitted by the surface units and determines its position from those acoustic message signals.

In another version of the positioning system, an acoustic transceiver unit is attached to one of the cables. The acoustic transceiver unit includes an acoustic receiver and an acoustic transmitter. The acoustic receiver receives the acoustic message signals transmitted by the surface units and determines its own position from those acoustic message signals. The acoustic transmitter in the acoustic transceiver unit transmits into the water acoustic message signals representing its own position. The acoustic receivers in at least some of the acoustic receiver units receive the acoustic message signals from the acoustic transceiver units for use in determining position. These acoustic transceiver units are used, for example, to augment the message signals transmitted by the surface units at positions along the streamers distant from the surface units or to improve the positioning geometry.

In a method for positioning streamer cables having features of the invention, a group of streamer cables is towed behind a marine vessel. The head ends of the cables are defined as those nearer the vessel, and the tail ends are the distal ends. Surface units including GPS receivers and acoustic transmitters are towed at spaced apart locations. Acoustic receiver units including acoustic receivers are attached along the cables. GPS message signals are received by the surface units and converted into position data. Acoustic message signals representing the surface unit's position are transmitted into the water acoustically by each surface unit. The acoustic message signals are received by the acoustic receiver units and are used to determine their positions.

Thus, the invention provides apparatus and methods for extending the accuracy of GPS, ubiquitous on the earth's surface, to the positioning of towed underwater streamers.

BRIEF DESCRIPTION OF DRAWINGS

These and other advantages, features, and aspects of the invention are better understood by referring to the following description, appended claims, and accompanying drawings in which:

FIG. 4 is a representation of a minimal message transmitted by the surface unit of FIG. 3;

FIG. 5 is a basic block diagram of an acoustic receiver unit embodying features of the invention usable in the deployment of FIGS. 1 and 2;

FIG. 9 is a block diagram of an acoustic transceiver unit embodying features of the invention usable in the method of FIG. 8.

DETAILED DESCRIPTION

Figure 1:
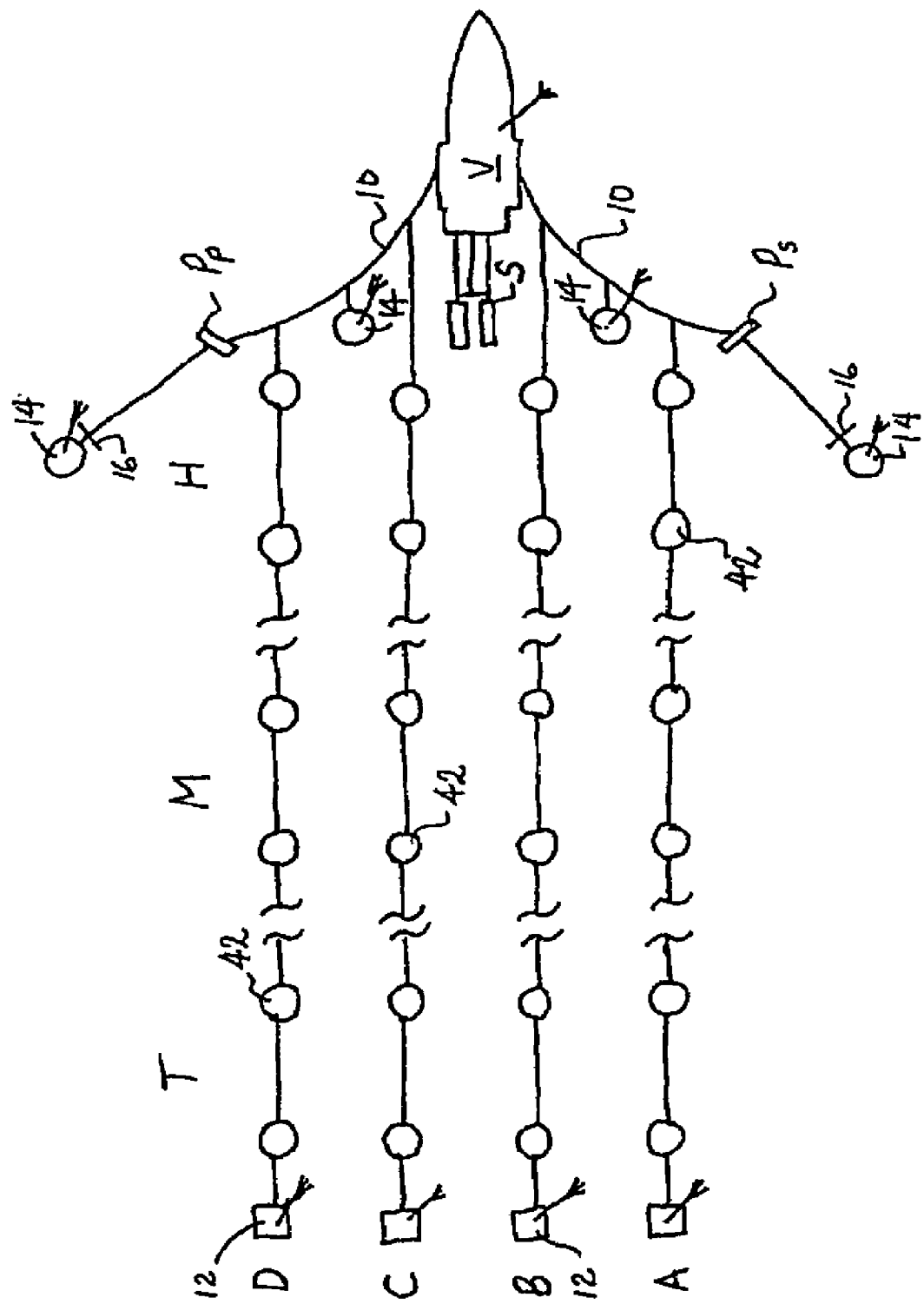
FIG. 1 is an overhead schematic view of one version of streamer deployment for use in a marine seismic survey embodying features of the invention.
Figure 2:
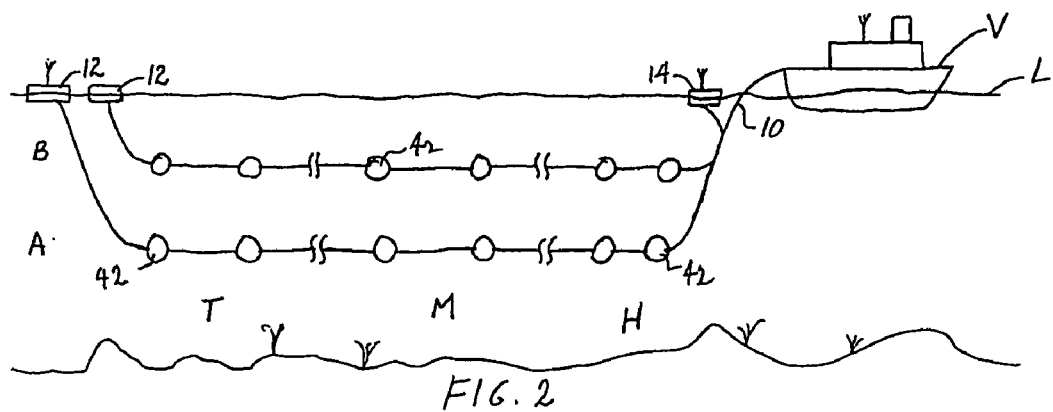
FIG. 2 is a partial side elevation view of the schematic of FIG. 1.

A streamer positioning system embodying features of the invention is depicted in the example of FIGS. 1 and 2. In the example, a marine vessel V is towing a network of hydrophone streamers, represented in FIG. 1 as four streamers A, B, C, and D. Of course, more or fewer streamers could be used. Streamers used in seismic prospecting are typically a few kilometers long. For example, the streamers may be 8 km long with the outermost streamers 700 m apart from each other. Here the streamers are shown broken into a head end section H nearest the vessel, a middle section M, and a tail end section T. In this example, streamer A is the outer starboard streamer; streamer B is the inner starboard streamer; streamer C is the inner port streamer; and streamer D is the outer port streamer. In FIG. 2, only the starboard streamers A, B are depicted at different depths for clarity.

Depth control devices (not shown) attached to the streamers about every 150 meters maintain the cables at a constant depth during a typical survey. The vessel also tows a seismic source S that may comprise an array of air guns. Port and starboard paravanes Pp, Ps at the ends of paravane cables 10 help keep the streamer cables spread apart. Although the streamer cables are shown with their head ends attached directly to the paravane cables, in an actual deployment, they are more typically attached to another cable strung between the port and starboard paravane cables. The head ends of the streamers are also electrically connected to the vessel to receive power and electrically or optically connected to receive command signals from and to send hydrophone and sensor data to the vessel. The tail end of each streamer is marked by a tail buoy 12 floating on the sea surface L and tethered to the tail end of the streamer.

Figure 3:
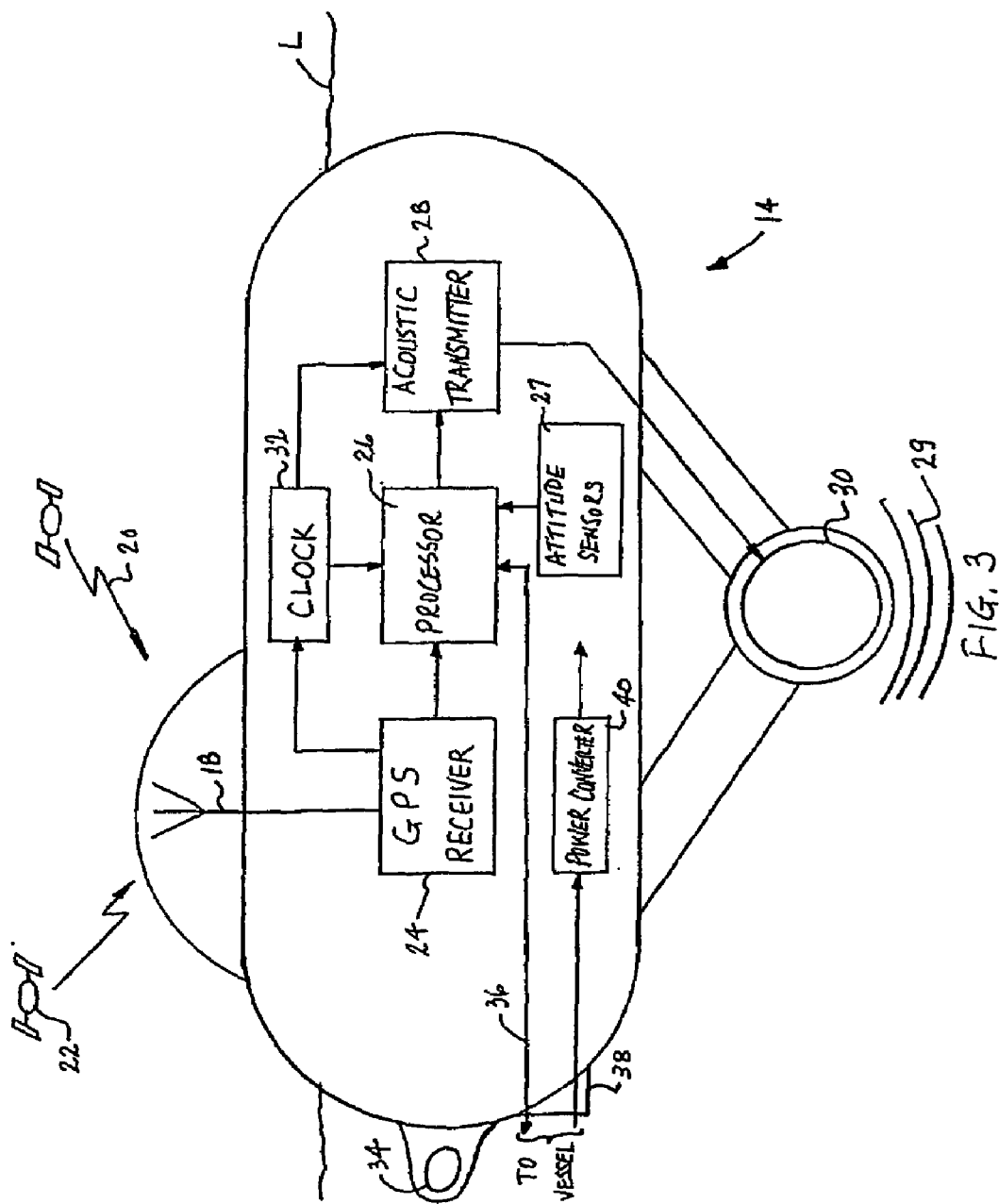
FIG. 3 is a block diagram pictorial of a surface unit embodying features of the invention usable in the deployment of FIGS. 1 and 2.

To help position the streamer cables, the vessel also tows surface units 14, which can be connected to the paravane cables inboard of the paravanes or outboard of the paravanes and further separated by auxiliary paravanes 16. The tail buoys 12 may also include surface units. As another alternative, remote-controlled, autonomous surface vehicles, such as a jet ski, could be outfitted with surface units. The surface unit, which is shown schematically in FIG. 3, is towed, dragged along the sea bottom behind, or otherwise travels with the vessel along the sea surface. The unit is buoyant to float at the surface. A GPS antenna 18 above the water line L receives radio-frequency GPS signals 20 from GPS satellites 22 or land-based differential GPS stations. (Although the term "surface units" is used throughout to refer to devices that receive GPS signals and transmit acoustic message signals, the term is not meant to be limited to devices that are towed only on the sea surface. What makes such a device a "surface unit" is its ability to receive radio-frequency GPS signals. Consequently, such a device incorporated into a paravane operating below the surface, but having a GPS antenna extending to the surface, is also defined as a surface unit in the lexicon of this specification. A conventional GPS receiver 24 uses the signals to determine its position (strictly speaking, the position of its antenna's phase center). A processor 26 collects position and other GPS data from the GPS receiver and attitude data from attitude sensors 27, such as pitch and roll sensors. The processor, which preferably includes a microprocessor, such as a Motorola MC68HC11, uses the GPS data, the attitude data, and a priori knowledge of the position of an acoustic transducer 30 relative to the GPS antenna in computing the transducer's absolute position, which is referred to herein as the position of the surface unit. The processor also preferably constructs a message to be transmitted by the transducer into the water, preferably an abbreviated message, such as that shown in FIG. 4, containing at least coordinates representing the transducer's position.

The message in the example of FIG. 4 contains only two 15-bit words representing the coordinates of the surface unit (more specifically, its transducer) in an x-y coordinate plane on the sea surface and an optional time stamp, which may include, e.g., a GPS time stamp or a sequence number. The origin of the x-y plane may be arbitrarily chosen, such as a fixed point in the seismic survey area or the position of a point on the moving survey vessel. The time stamp, which is optional in certain circumstances explained subsequently, is based on the GPS time received from the satellites. As mentioned previously, this abbreviated message is the preferred message, but additional data or identification indicia could be included. The time stamp is not necessary in some versions of the positioning system and can be eliminated in those applications. A sequence number that is incremented each measurement cycle offers an alternative to the GPS time stamp. The sequence number indicates the measurement cycle to which the message data pertains so that ambiguities caused by late-received messages can be resolved. A word length of three bits suffices for the GPS time stamp or the sequence number. The message is sent to an acoustic transmitter 28 that generates, in a preferred version, a pseudo-random code spread-spectrum signal modulated by the message in an acoustic frequency band, e.g., 2 kHz–20 kHz. Each surface unit preferably has a unique pseudo-random code to distinguish itself from the other surface units. For example, a 4095-chip Gold code, which supports five sufficiently uncorrelated channels per carrier frequency, operating at a carrier frequency of about 5 kHz is appropriate for a range of 12 km. A carrier frequency of about 10 kHz is appropriate for a range of 3 km. Message word lengths of 15 bits are preferable for x-y position because 15 bits provide sufficient spatial resolution and because 15 is an integral factor of the code length of 4095. As a second example, a 1023-chip Gold code, which supports five sufficiently uncorrelated channels per carrier frequency, operating at a carrier frequency of about 5 kHz is appropriate for a range of 12 km. A carrier frequency of about 10 kHz is appropriate for a range of 3 km. Message word lengths of 15 bits are preferable for x-y position because 15 bits provide sufficient spatial resolution. Message lengths of 33 bits are preferred because 33 is an integral factor of the code length of 1023. At 1023 chips per second, the code repeats every second. At 33 bits per second, the message completes in one second. The three-bit time stamp sequence number repeats itself every 8s, yielding unambiguous range determination out to 12 km, for the speed of sound c=1500 m/s. The spread spectrum acoustic message signal 29 is transmitted into the water by the acoustic transducer, which may be a ceramic sphere or a ceramic cylinder for an omnidirectional beam pattern. A clock 32 provides clock signals to the processor and the acoustic transmitter. The clock can be synchronized to the internal clock in the GPS receiver. The acoustic message signals can be transmitted continuously so that the receivers can maintain lock. In the event that an acoustic message signal is interrupted by, for example, interference from the seismic source, phase-locked loops in the receivers can be allowed to coast whenever the signal-to-noise ratio drops below a threshold value and to resume tracking once the signal-to-noise ratio increases to an acceptable level. Similarly, the transmitters can be operated in a pulsed mode, in which the acoustic message signals are gated on and off at regular intervals. The continuously transmitted acoustic signal allows the acoustic receivers to update their positions often enough to permit autonomous cable-steering by a co-located cable control device. Furthermore, in the event of a loss of communication with the surface vessel's shipboard navigation system, the positioning system of the invention can continue to steer or level the cables because it does not need the shipboard navigation system to send control commands. Autonomous cable control is thereby achieved. The message with its telemetry data is not necessary in all applications. Without the telemetry data, the coded signals transmitted into the water by the surface units are received and tracked by the receivers as described above. The code delays measured in the receivers represent pseudoranges (the transit time from the surface units to the receivers). Position information can be derived from the pseudoranges on board the vessel.

The surface unit is tethered to a tow point by a tow leader or rope attached to an eyelet 34 in this example. A communication link 36 is established between the vessel's shipboard navigation system and the processor preferably via a hardwired optical or electrical conductor through a watertight connector 38. The surface unit also preferably derives power from the vessel through an electrical cable containing the hardwired communication link. A power converter 40 converts and regulates the input power into the voltages needed to power the electronics in the surface units. It would, of course, be possible to power the surface unit with batteries or other power sources and to establish a radio communication link with the vessel to eliminate the hardwired connection. The communication link can be used to monitor and control the operation of the surface unit from the vessel.

The acoustic message signals transmitted into the water by the surface units are received by acoustic receiver units 42 attached to the streamer cables along their lengths, as shown in FIGS. 1 and 2. The acoustic receiver units are preferably mounted inside the streamer or inline with the streamer connected between two consecutive streamer sections. In a typical deployment, the acoustic receiver units may be installed in the center of each hydrophone receiver group and at the locations of cable controllers, such as cable-leveling or -steering devices. Depending on the transmit range of the acoustic transmitter in the surface units and on the length of the streamers, all or a portion of the acoustic receiver units will receive the acoustic message signals of all the surface units. It is possible, however, for acoustic receiver units to be able to receive acoustic message signals from nearby surface units, but not from distant units.

A block diagram of the acoustic receiver unit is shown in FIG. 5. Incoming acoustic message signals 29 from surface units are received by an acoustic transducer 44 in each acoustic receiver unit. The receiving transducer can be a ceramic sphere, a PVDF (polyvinylidene fluoride) tape, or other structure, but, because it does not transmit, may be much smaller than the transducer in the surface units. The output of the transducer is applied to an acoustic receiver 46. The acoustic receiver decodes the spread-spectrum acoustic message signals to determine identities of the transmitting surface units and to use the position data and optional time stamp contained in the messages to determine its own position. In this way, the acoustic receiver performs a function analogous to that of the radio-frequency GPS receivers on the surface units. The position information is sent to a processor 48 similar to the processors in the surface units. Furthermore, like the surface units, the acoustic receiver units include a clock 50. A power converter 52 receives power from the vessel via the streamer cable ohmically or inductively or from a battery and converts the power into the operating voltages needed by the electronics. A communication link 54 is established between the acoustic receiver units and the vessel over the streamer and its communication system. Command and control messages can be sent to the acoustic receiver units over the communication link from the shipboard navigation system. It can also send clock-synchronizing message signals to periodically synchronize the clocks in the various receiver units, preferably tied to GPS time, to avoid clock drift problems. Synchronizing the clocks in the receiver units with the transmitter clocks allows a given position to be computed from fewer observations. This is especially important for long and geometrically challenging ranges. Status and position information can be sent to the vessel from the acoustic receiver units. The units can be self-contained or can be part of a device having other functionality. For example, the acoustic receiver units can be part of or co-located with a cable-leveling or cable-steering device, such as a bird.

Figure 6:
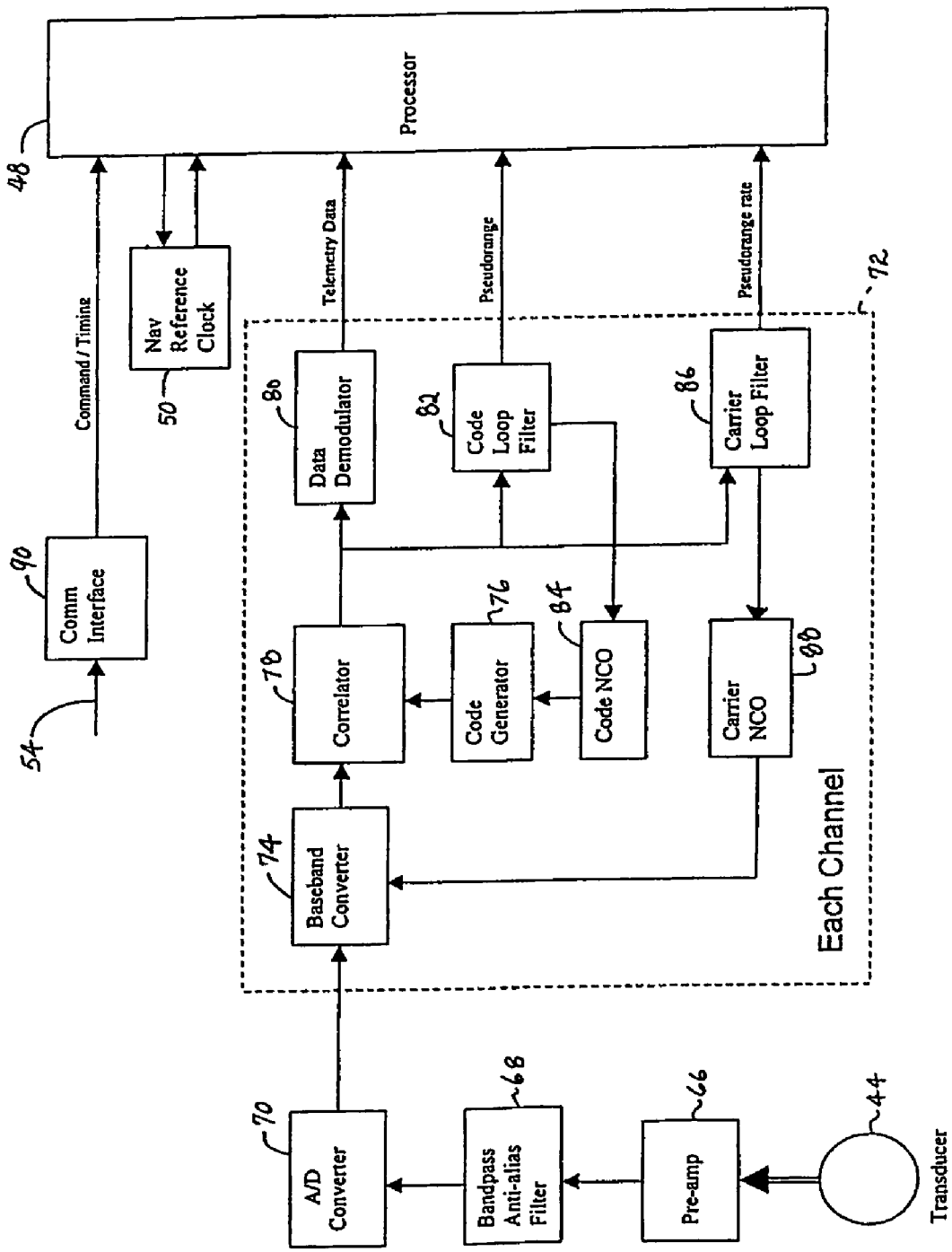
FIG. 6 is a more detailed block diagram of an acoustic receiver as in FIG. 5.

The receiver unit is shown in further detail in FIG. 6. The transducer 44 converts inbound message signals into electrical signals that are amplified in a pre-amp 66, filtered in a bandpass anti-aliasing filter 68, and sampled and converted into digital samples by an analog-to-digital (A/D) converter 70. The digital samples are directed to one or more receiver channels 72. In a preferred version, 11 frequency or FDMA (frequency division multiple access) channels are used. Five codes or CDMA (code division multiple access) channels are available per frequency channel. Preferably there are a total of 55 FDMA/CDMA channels available to the system. The digital samples representing the acoustic message signals are frequency downshifted to the base band in a baseband converter. The baseband samples are correlated with the channel's pseudo-random code generated by code generator 76 in a correlator 78 to extract the digital channel signal. Telemetry data (the message data) modulating the acoustic message is extracted in a data demodulator 80 and sent to the processor 48. The pseudorange data, i.e., the range from the transmitting surface unit on that channel, is extracted in a code tracking loop filter 82 and sent to the processor. The code tracking loop filter also constantly adjusts the code phase through a code NCO (numerically controlled oscillator) 84. The code delay is a measure of the time of transit of the acoustic message signal from the source transmitter (surface unit transducer) to the receiver transducer. A carrier tracking loop filter 86 adjusts the local frequency used by the baseband converter to account for Doppler shift in the acoustic signal carrier frequency. A carrier NCO 88 controlled by the carrier tracking loop filter effectively adjusts the local frequency applied to the baseband converter. The carrier loop filter also outputs the pseudorange rate, which is a measure of the relative speed between the source transmitter and the receiver during the acoustic transit time, to the processor for use in compensating for the effect of that relative motion on the position computation. Command and synchronizing signals are transmitted to the processor over a communication link 54 through a communication interface 90. A clock 50 and signals derived from it are used by the processor and the receiver electronics for accurate receiver operation. Computed positions, raw pseudorange data, and other data can also be transmitted to the vessel over the communication link.

Figure 7:
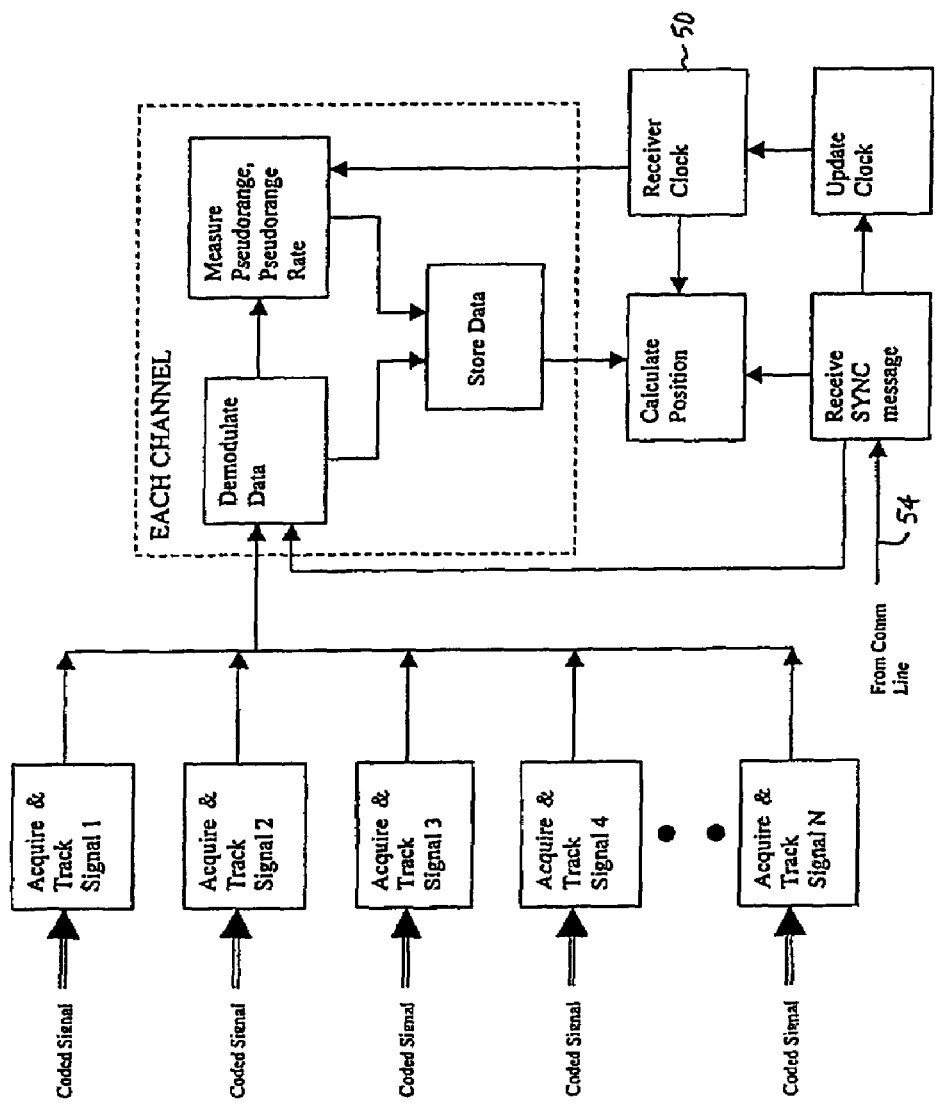
FIG. 7 is a functional block diagram of an acoustic receiver as in FIG. 5.

A functional block diagram of receiver operation is shown in FIG. 7. Each receiver is capable of acquiring and tracking N acoustic signals. In the preferred version, each receiver can receive 12 signals, each on an individual FDMA/CDMA channel. The signal for each channel is demodulated to extract the telemetry, or message, data. The code and carrier tracking loop filters measure the pseudorange and the pseudorange rate. The message data, the pseudorange, and the pseudorange rate are stored in memory for use by the processor in computing the positions of the receiver transducer. To eliminate timing ambiguities between the source transmitters and the receivers, a clock-synchronizing signal is transmitted over the communication link to update the receiver clock and resynchronize the signal generators and other receiver blocks. If the synchronizing signal is interrupted or lost, timing ambiguity can be resolved for a limited period of time by receiving three or more ranges and telemetry data and solving for the receiver clock offset.

In one preferred version of the positioning system, a 4095-chip Gold code at a chip rate of 455 Hz is used. This results in a 9s code period. One message block is transmitted each second. All surface units, including the shipboard controller, synchronize to GPS time. Surface units with acoustic transmitters synchronize the start of each acoustic code period to the GPS 1 PPS signal (every 9s). In the absence of a clock-synchronizing message signal over the communication link, receivers rely on their local clocks for maintaining synchronization. In a second preferred version of the positioning system, a 1023-chip Gold code at a chip rate of 1023 Hz is used. This results in a one-second code period. One message block is transmitted each second. All surface units, including the shipboard controller, synchronize to GPS time. Surface units with acoustic transmitters synchronize the start of each acoustic code period to the GPS 1 PPS signal and the time stamp or sequence number (every 8s).

Message blocks recur at 1s intervals, with a fresh position update each second that corresponds to the transmitter's position at the start time of message block transmission. Each message contains a message sequence number (1–9 or 0–7, depending on the preferred version used) indicating the second of time that code period occupies in GPS time. The message sequence number can be used by a receiver to resolve range ambiguity due to code length. For pulsed transmission modes, each transmitter maintains a 1s counter derived from the GPS 1 PPS output, with a rollover interval that is 2 to 4 times its periodic transmission interval. All position computations solve for a two-dimensional x-y position (x-coordinate, y-coordinate), using the measured depth of the receiver and either nominal or measured depths of transmitters in slant range calculations.

The system is designed to operate in a variety of operating modes. In a first mode, the transmitters and the receivers operate continuously and the receivers are resynchronized periodically over the communication link. A clock-synchronizing message signal is transmitted over the communication link at the start of each acoustic code period to synchronize receiver clocks to GPS time. Receivers continually track the transmitters' coded signals. The transmitter message sequence number and x-y position are included in each transmitter's message block. The receiver decodes this information on reception and stores it in local memory. On reception of a synchronizing signal, the receiver performs any required clock adjustment to align its clock with the reception time of the synchronizing signal (adjusted for communication delays) and begins a position update. The receiver simultaneously measures the code phase from each transmitter, and retrieves the latest decoded positions from its local memory. In general there will be different time offsets between the common code phase measurement time and the start of last message block for each received signal. For each transmitter, the receiver measures and stores these time offsets for use in the position calculation. To determine each pseudorange, the receiver multiplies the fractional value determined from the code phase correlation for that transmitter by the code period. The receiver computes its position using sound speed through water, the measured pseudoranges, and the received transmitter positions adjusted to the code phase measurement time. Because receiver clock offset is eliminated as an unknown, autonomous operation is possible with two range observations.

In another operating mode, the transmitters and the receivers operate continuously, but without benefit of a clock-synchronizing signal. This mode requires a third pseudorange to resolve receiver clock offset. This is the backup mode for the previous mode when the communication link is lost.

In a third mode of operation, the transmitters transmit at a duty cycle of 50% or less with periodic clock synchronization. The receivers are also not operated continuously. A shipboard-initiated clock-synchronizing message is transmitted over the communication link to all transmitters and receivers. On receiving the synchronization signal, each transmitter transmits a short coded signal containing a unique transmitter ID and its current x-y position determined by its GPS receiver. On reception of a clock-synchronization signal, each receiver starts a timer and begins listening for the coded signals. When a signal is received, the position is decoded and the timer value is stored. The signal reception time represents the pseudorange for that transmitter. The receiver computes its position using sound speed through water, the measured pseudoranges, and the received transmitter positions. Because receiver clock offset is eliminated as an unknown, autonomous operation is possible with two range observations.

In yet another mode, the transmitters are operated at a duty cycle of 50% or less, but the receivers are on continuously. But no clock-synchronizing message signal is sent over the communication link. At a periodic interval based on GPS time, each transmitter simultaneously transmits a coded signal containing a unique transmitter ID and a message block containing its current x-y position and GPS time. Each receiver's clock has an unknown offset from GPS time. Receivers continuously listen for the coded signals. When a signal is received from a transmitter, the transmitter position and signal transmission time are decoded. The difference between signal reception and transmission times represents the pseudorange for that transmitter, but includes the receiver clock offset. The receiver solves for its position and clock offset using sound speed through water, at least three measured pseudoranges, the received transmitter positions, and the received signal transmission times. To ensure orthogonality, each transmitter uses its entire one-second Gold code in the case of the 1023-bit version. This could, for example, keep the transmitter duty cycle below 20% for a 5s update cycle.

For accurate in-water position calculations, it is necessary to account for transmitter motion. There are several ways to recover the approximate position of a transmitter to use in the receiver position calculation. For each pseudorange measurement, to remove the effects of transmitter motion during the message reception delay interval (time between pseudorange measurement and start of the previous message block), the transmitter position received in the message block must be projected forward in time to the time corresponding to the transmission of the code chip processed at pseudorange measurement time. Here are three ways:

1) The receiver continually decodes message blocks and maintains a filtered estimate of transmitter velocity. It uses the received transmitter position to update the filter and uses the velocity estimate to project the transmitter position forward in time by an interval equal to the time between pseudorange measurement and start of the previous code cycle (one code cycle plus the time equivalent of the measured code phase).

2) The receiver continually decodes message blocks and keeps a one-entry buffer of the last transmitter position decoded. At pseudorange measurement time, the receiver decodes the next available message block to get the newer transmitter position, and measures the message delay interval. It then interpolates between the current and previous transmitter positions based on the message delay interval to estimate transmitter position at the transmission time of the measured pseudorange.

3) The transmitter velocity is added to the surface unit message block. The receiver uses the received transmitter position and velocity to project the transmitter position forward in time by an interval equal to the message delay interval.

Clock drift and the concomitant errors it causes in the position estimates can be removed or minimized by involving the range from one more surface unit to determine position. One can consider the four unknown position variables of an acoustic receiver unit to be: a) x-coordinate; b) y-coordinate; c) z-coordinate; and d) time (receiver time ambiguity, or time offset). To resolve these four variables, four individual ranges (from four individual surface units) are required. Resolving the time variable equivalently removes clock drift of the clock in the acoustic receiver unit. If the elevation (depth) is controlled, i.e., the z-coordinate is known or assumed, only three surface units are required. Periodically synchronizing the clocks in the acoustic receiver units over the communication links can also eliminate a range. Thus, only two ranges (two surface units) are required if the clocks are synchronized by a clock-synchronization signal or corrected by time-stamping and the depth is controlled. If depth is not controlled, only three surface units are required as long as the clocks are periodically synchronized. Thus, clock drift can be removed by overestimation or by periodic clock synchronization.

Figure 8:
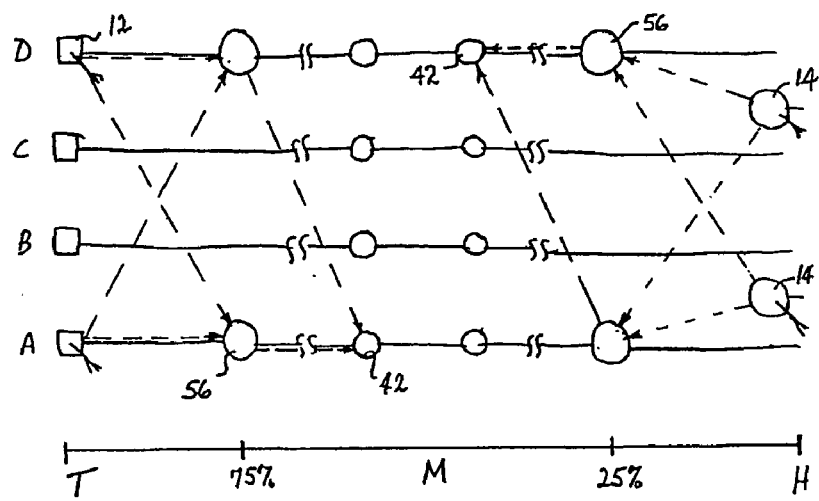
FIG. 8 is a schematic representation of one method for positioning streamer cables according to the invention in a deployment as in FIGS. 1 and 2.

In some instances, especially near the middle M of the streamer, as shown in FIG. 8, accurate position estimates of the acoustic receiver units can be difficult to achieve. Because it is unconventional to tether floating objects to a streamer in the midsection, the surface units will usually be near the head ends and the tail ends of the streamer. Because of signal degradation and acoustic range limits, as well as bad geometries, at long ranges, it may be necessary to supplement or completely replace the acoustic message signals transmitted by the surface units with other acoustic message signals. One way to achieve this result is with acoustic transceiver units 56 attached to the streamer cables at, for example, positions 25% and 75% of the length of the streamer. The acoustic transceiver units can be similar to the acoustic receiver units 42, but with the additional capability of transmitting acoustic message signals 58 as shown in the block diagram of FIG. 9. The acoustic transceiver units have a receive channel just like that of the acoustic receiver units. The only difference is that a larger acoustic transducer 60 is preferably used to extend the range of acoustic transmission. An acoustic transmitter 62 is coupled to the transducer to generate the acoustic pulses to be transmitted into the water. As best shown in FIG. 8, the acoustic message signals transmitted by the surface units at the head end of the streamers are received by the acoustic transceiver units at the 25%-of-length position 64. The acoustic receiver decodes the received message signal 29 and determines its position. A transmit message signal 58 containing a message containing the acoustic transceiver unit's position is transmitted acoustically to be received by the acoustic receiver units 42 in the middle sections M of the streamer. Thus, the transmitter in the acoustic transceiver units functions in a manner similar to the acoustic transmitters in the surface units. In this way, position fixes can be transmitted to mid-streamer positions.

Favorable geometries can be achieved, as shown in FIG. 8, by positioning acoustic transceiver units at the 25% and 75% positions on the outermost streamers A, D. By receiving and processing acoustic message signals transmitted by the head-end surface units, the acoustic transceiver units at the 25% position can determine their positions. Then those units can transmit acoustic message signals representing their positions and optionally including a time stamp, which can be received by acoustic receiver units 42 in the headmost portion of the middle section M and used to determine their positions. Similarly, surface units at the tail end, such as in the tail buoys 12, can be used to position acoustic receiver units 42 in the tailmost portion of the middle section via intervening acoustic transceiver units at the 75% position. With an augmentation scheme such as this, the entire cable can be accurately positioned.

Figure 10:
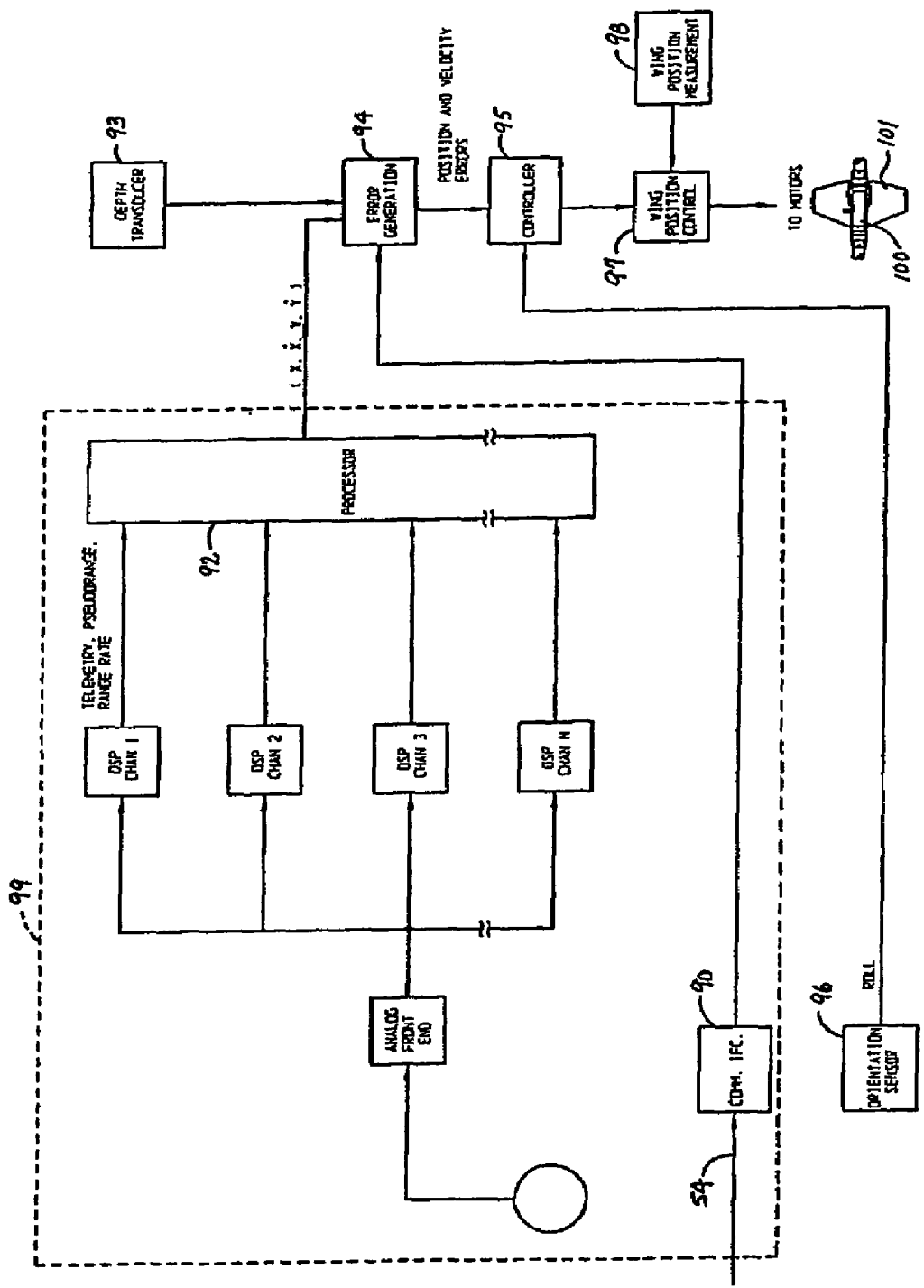
FIG. 10 is a block diagram of a cable control device using an acoustic receiver as in FIG. 5.

One special use of the acoustic receiver units is in conjunction with cable control devices attached to the streamer cables and capable of leveling or steering the cables by means of at least two control surfaces, commonly referred to as wings. An acoustic receiver unit associated with a closely positioned cable control device or even housed within the cable control device provides the device with the capability to autonomously control the cable without continuous reliance on a shipboard controller. As shown in FIG. 10, x-y position and position rate information (x, dx/dt, y, dy/dt) is calculated in the processor 92 from the acoustic message data, pseudoranges, and pseudorange rate data developed from the messages received over the various channels by an acoustic receiver unit 99 associated with or housed within each control device 100. Along with depth information as measured by a depth sensor 93, the position and position rate information is used to control the depth and lateral offset of the cable. The devices may be commanded by the shipboard controller over the communication link 54 through a communication interface 90 to maintain a position relative to the vessel or to one of the surface units. Alternatively, the devices may be commanded to follow a predetermined flight path along the prospect. The device receives a command or series of commands over the communication link representing required depth and lateral position relative to the boat or prospect. The actual lateral position is calculated in the processor. Subtracting the actual calculated position from the desired position in an error detector 94 yields an error vector. This vector is used by a wing controller 95, which, like the error detector, is preferably realized as part of a wing control algorithm, but could alternatively be implemented in hardware, to calculate desired wing positions. (The control algorithm could be similar to that used in an autopilot used to control aircraft.) The wing controller output derived from the position, position rate, and the depth errors and the orientation of the cable control device, as measured by an orientation (e.g., roll) sensor 96, for example, is sent to a wing position control 97. The actual positions of the wings 101 are measured by wing position sensors 98. From the actual wing positions and the wing controller output, the wing position control sends control signals to wing motors to move the wings accordingly. The overall wing controller can be implemented in a number of ways. For example, the depth and lateral position can be controlled separately by two individual PID loops or in combination using state variable equations or fuzzy logic control.

For an in-line cable control device whose longitudinal axis coincides with the streamer's axis, the roll of the device about that axis can be controlled. The wings can be pitched to give a force in any direction perpendicular to the streamer axis. The wings' positions can be controlled by stepper motors or by using servo motors in conjunction with wing position measurements and wing position controllers. The roll about the cable can alternatively be controlled with a separate motor. As another example, a device with three or four wings can be used to control forces about the cable.

In this way, streamer control can exist even if communication between the device and the shipboard system is lost. If backup batteries are incorporated in the device, streamer control can be maintained if all electrical and optical connections are lost with the shipboard system.

Thus, the invention provides apparatus and methods for adapting GPS to the positioning of underwater streamer cables towed behind a survey vessel during seismic prospecting.

Although the invention has been described in detail with reference to preferred apparatus and methods, other versions are possible. For example, the specific geometry defined by the surface units and the acoustic transceiver units was an example only. Other arrangements are clearly possible. As another example, the content of the messages could include other data or position information of greater or less resolution than 15 bits. Depth sensors could be co-located with the cable-mounted receiver units to derive the third component of position. Equipment other than streamer cables and ocean bottom cables could be positioned with the system. So, as these examples suggest, the spirit and scope of the claims are not limited to the description of the preferred versions.

What is claimed is:

1. A positioning system for one or more cables towed underwater behind a marine vessel, the positioning system comprising:
   at least two surface units traveling with a marine vessel at the water surface, each surface unit including:
   a GPS receiver for receiving radio-frequency GPS signals and determining the position of the surface unit; and
   an acoustic transmitter for transmitting into the water acoustic message signals representing the position of the surface unit;
   a plurality of acoustic receiver units disposed underwater along one or more cables towed underwater behind the marine vessel, each cable extending from a head end nearer the marine vessel to an opposite tail end, each acoustic receiver unit including:
   an acoustic receiver for receiving the acoustic message signals transmitted by the plurality of surface units and determining the position of the acoustic receiver unit from the acoustic message signals.

2. A positioning system as in claim 1 further comprising:
   an acoustic transceiver unit attached to one of the cables and including:
   an acoustic receiver for receiving the acoustic message signals transmitted by the plurality of surface units and detaching its position from the acoustic message signals; and
   an acoustic transmitter for transmitting into the water acoustic message signals representing its position, and
   wherein the acoustic receivers in at least some of the acoustic receiver units receive the acoustic message signals from the acoustic receiver unit for use in determining position.

3. A positioning system as in claim 1 comprising four surface units, two of the surface units towed on opposite sides of the marine vessel near the head end of the cable and two of the surface units towed spaced apart near the tail end of the cable.

4. A positioning system as in claim 2 having a plurality of cables towed behind the marine vessel and wherein the surface units are towed near the head end and the tail end of the cable and comprising a plurality of acoustic transceiver units disposed between the head end and the middle and the tail end and the middle of the outermost towed cables.

5. A positioning system as in claim 1 further comprising a communication link between the marine vessel and the acoustic receiver units over which position data from the acoustic receiver units are transmitted to the marine vessel.

6. A positioning system as in claim 1 further comprising a two-way communication link between the marine vessel and the surface units and the acoustic receiver units.

7. A positioning system as in claim 1 comprising at least three surface units and wherein each acoustic receiver receives acoustic message signals transmitted from three surface units.

8. A positioning system as in claim 1 wherein the acoustic message signal includes a time stamp.

9. A positioning system as in claim 8 wherein the time stamp is a sequence number.

10. A positioning system as in claim 1 further comprising a communication link between the marine vessel and the acoustic receiver units over which a clock-synchronizing signal is sent to the acoustic receiver units.

11. A positioning system as in claim 1 wherein the GPS receiver in the surface units recovers GPS time from the radio-frequency GPS signals and wherein the surface units further include a clock synchronized to GPS time, the clock determining the time of transmission of the acoustic message signals.

12. A positioning system as in claim 1 further comprising a cable control device associated with the acoustic receiver unit and using the position determined by the acoustic receiver unit to control the cable.

13. A positioning system as in claim 1 wherein at least one of the surface units is housed in marine survey equipment selected from the group consisting of: paravanes, tail buoys, and remote-controlled, autonomous surface vehicles.

14. A method for positioning underwater streamer cables towed behind a surface vessel in a marine seismic survey, comprising:
attaching acoustic receiver units at spaced apart locations on one or more steamer cables;
towing the steamer cables underwater behind a surface vessel;
towing a plurality of surface units including GPS receivers and acoustic transmitters behind the surface vessel;
receiving GPS signals in the surface units;
transmitting acoustic message signals from each of the surface units representing the surface unit's position;
receiving the acoustic message signals in the acoustic receiver units to determine the positions of the acoustic receiver units.

15. The method as in claim 14 further comprising:
sending a clock-synchronizing signal to the acoustic receiver units.

16. The method as in claim 14 further comprising:
recovering GPS time from the GPS signals received in the surface units to synchronize the transmitting of the acoustic message signals to GPS time.

17. The method as in claim 14 further comprising:
attaching acoustic transceiver units including acoustic receivers and acoustic transmitters at locations on one or more of the steamer cables;
receiving the acoustic message signals transmitted by the surface units in the acoustic transceiver units;
transmitting acoustic message signals from each of the acoustic transceiver units representing the acoustic transceiver unit's position; and
receiving the acoustic message signals transmitted by the acoustic transceiver units in the acoustic receiver units to determine the positions of the acoustic recover units.

18. The method as in claim 17 further comprising:
sending a clock-synchronizing signal to the acoustic receiver units and the acoustic transceiver units.

19. The method as in claim 14 further comprising:
controlling the position of the underwater cables from the positions determined by the acoustic receiver units.

20. A positioning system for one or more cables towed, or dragged, underwater behind a marine vessel, the positioning system comprising:
at least two surface units traveling with a marine vessel along the water surface, each surface unit including:
a GPS receiver for receiving radio-frequency GPS signals; and
an acoustic transmitter for transmitting into the water coded signals identifying the particular surface unit;
a plurality of acoustic receiver units disposed underwater along one or more cables towed underwater behind the marine vessel, each cable extending from a head end nearer the marine vessel to an opposite tail end, each acoustic receiver unit including:
an acoustic receiver for receiving the coded signals transmitted by the plurality of surface units and determining the code delay of the coded signals so that the position of the acoustic receiver unit can be determined.

21. A positioning system as in claim 20 further comprising:
a navigation system aboard the marine vessel;
a communication link between the navigation system and the acoustic receiver units,
wherein the acoustic receiver units transmit pseudorange data indicative of the code delay of the coded signals to the navigation system to determine the positions of the acoustic receiver units.

22. A positioning system as in claim 21 wherein the navigation system transmits a clock-synchronizing signal over the communication link to the acoustic receiver units.

23. A positioning system as in claim 21 further comprising a cable control device associated with and proximate to each acoustic receiver unit and wherein the navigation system transmits a command signals over the communication link to the cable control device to control the position of the cable.

24. A positioning system as in claim 20 wherein the acoustic transmitter in each surface unit transmits telemetry data indicative of the surface unit's position with the coded signals to the acoustic receiver units.

25. A positioning system as in claim 20 wherein the GPS receiver in the surface units recovers GPS time from the radio-frequency GPS signals received in the surface units to synchronize the transmitting of the coded signals to GPS time.

26. A positioning system as in claim 20 wherein at least one of the surface units is housed in marine survey equipment selected from the group consisting of: paravanes, tail buoys, and remote-controlled, autonomous surface vehicles.

* * * * *